(12) United States Patent
Erb (10) Patent No.: US 7,707,560 B2
(45) Date of Patent: Apr. 27, 2010

(54) ANALYZING SOFTWARE PERFORMANCE WITHOUT REQUIRING HARDWARE

(75) Inventor: David John Erb, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 40 days.

(21) Appl. No.: 12/049,309

(22) Filed: Mar. 15, 2008

(65) Prior Publication Data
US 2008/0162108 A1 Jul. 3, 2008

Related U.S. Application Data

(63) Continuation of application No. 11/252,406, filed on Oct. 18, 2005.

(51) Int. Cl.
*G06F 9/44* (2006.01)
(52) U.S. Cl. .................. 717/131; 717/127
(58) Field of Classification Search .......... None
See application file for complete search history.

(56) References Cited

U.S. PATENT DOCUMENTS 5,488,729 A * 1/1996 Vegesna et al. ............ 712/209

7,043,668 B1 * 5/2006 Treue et al. ................ 714/45

OTHER PUBLICATIONS

Chris Weaver et al., Performance Analysis Using Pipeline Visualization, Nov. 2001, ISPASS.*
Amy McGovern et al., "Building a Basic Block Instruction Scheduler with Reinforcement Learning and Rollouts", Nov. 2002, Kluwer Academic Publishers, vol. 49, pp. 141-160.*

* cited by examiner

*Primary Examiner*—Wei Y Zhen
*Assistant Examiner*—Lanny Ung
(74) *Attorney, Agent, or Firm*—VanLeeuwen & VanLeeuwen; Matthew B. Talpis (57) ABSTRACT

An approach of analyzing software performance without requiring hardware is presented. A timing description generator logs instruction performance characteristics for each of the assembly code's instructions. The performance characteristics identify whether an instruction issued or stalled during particular instruction cycles. Once the timing description generator cycles through the instructions and logs performance characteristics for each instruction, the timing description generator generates a performance graph. For each page line, the performance graph includes 1) dual-issue information if applicable, 2) instruction cycle counter values/stalled instruction identifier's that are positioned at corresponding line location values, and 3) the instruction. A developer may analyze the performance graph and identify code locations that require optimization in order to increase performance.

17 Claims, 6 Drawing Sheets

```
       320              330                   340
        |                |                     |
  0 | 01                              | cgti    $9,$12,0
  0d| 12                              | il      $5,0
  1D| ~2345                           | brz     $9,.LC__1465
  0D|    34                           | ai      $9,$12,127
  1D|    3456                         | cbd     $15,0($13)
  0 |     45                          | ai      $13,$13,1
  0 |      56                         | andi    $9,$9,255
  0D|       67                        | cgti    $14,$13,15
  1D|        6                        | lnop
  0D|         78                      | il      $12,16
  1D|         7890                    | shufb   $10,$9,$10,$15
  0D|           8                     | nop     $55
  1D|           8901                  | brz     $14,.LC__1466
  0D|            90                   | il      $13,0
  1D|             901234              | lqa     $15,num+0
  1 |              0123               | cwd     $9,0($1)
  1 |               123456            | lqa     $14,bufptr+0
  0 |                ~~~56            | ai      $19,$15,1
  0 |                 6789            | shli    $20,$15,4
  0D|                   78            | clgti   $21,$19,255
  1D|                   7890          | shufb   $15,$19,$15,$9
  0d|                     8           | nop     $56
  1d|                     ~~012345    | stqx    $10,$14,$20
  0D|                       12        | il      $10,0
  1D|                       123456    | stqa    $15,num+0
  0D|                         2       | nop     $57
  1D|                         2345    | brz     $21,.LC__1466
  1D|                           34    | il      $15,4096
  1D|                           345678| lqa     $22,buf_id+0
  0D|                             45  | il      $19,32
  1D|                             456789| lqa   $20,sys_ptr+0
```

ANALYZING SOFTWARE PERFORMANCE WITHOUT REQUIRING HARDWARE

RELATED APPLICATIONS

This application is a continuation application of co-pending U.S. Non-Provisional patent application Ser. No. 11/252,406, entitled "System and Method for Analyzing Software Performance Without Requiring Hardware," filed on Oct. 18, 2005.

BACKGROUND OF THE INVENTION

1. Technical Field

The present invention relates to a system and method for analyzing software performance without requiring hardware. More particularly, the present invention relates to a system and method for using assembly code to generate a performance graph that represents an instruction's execution progress as it relates to a program's actual instruction sequence.

2. Description of the Related Art

Software designers are typically faced with the problem of accurately analyzing software performance and efficiency, whether hardware (e.g. a processor) is available or not. When the hardware is available, a typical software measurement technique is to run the software program on the hardware, and sampling the program counter's location at periodic intervals. After the program finishes, the samples may be drawn on a chart to assess software performance. However, this sampling technique only obtains one data point per interval. Thus, if the sampling interval is too large, much of the program run-time is effectively ignored. Conversely, if the sampling interval is too small, the act of tracing the program will itself affect the program's performance. In addition, both of these techniques only provide a fairly broad overview of the program's performance.

When the hardware is in development and, therefore, not available, the above performance measurement technique is not possible. One option is to use a simulator, but a challenge found is that simulators are too slow and inaccurate to measure a program's performance based upon actual hardware, which thus makes it difficult to accurately assess a program's actual efficiency. This is an especially critical problem for hardware compiler developers because they have no simple way of determining compiler-generated assembly code quality.

Furthermore, a challenge found is that processors themselves are becoming increasingly complicated. In modern processors, each hardware instruction has its own characteristics that affect performance, including multiple pipes, multiple-instruction issue, dependencies, instruction-pairing, latency, instruction location, and setup. Thus, measuring a program's performance before hardware becomes available is virtually impossible, and when hardware is available, only a broad overview is obtained.

What is needed, therefore, is a system and method to accurately assess instruction-level software performance regardless of hardware availability.

SUMMARY

It has been discovered that the aforementioned challenges are resolved using a system and method for using assembly code to generate a performance graph that represents an instruction's execution progress as it relates to a program's actual instruction sequence. A timing description generator logs instruction performance characteristics for each of the assembly code's instructions, and generates a performance graph that includes the performance characteristics. As such, the performance graph provides an extremely accurate representation of an instruction when it executes on a processor.

A compiler generates assembly code and passes the assembly code to the timing description generator. For example, a developer may add an optional pass to the compiler that loads the assembly code into the timing description generator. In one embodiment, the timing description generator resides within the compiler. In another embodiment, a software developer generates the assembly code instead of the compiler.

The timing description generator receives the assembly code, and generates performance characteristics that provide a graphical representation of an instruction's performance. In one embodiment, the timing description generator displays each instruction on a separate page line, and displays the instruction's execution progress (performance characteristics) in the same page line on a "line location" basis.

In order to track instruction cycles and line locations, the timing description generator includes a instruction cycle counter and a line location tracker, which may be counters that count up to a particular value and then reset. The instruction cycle counter increments on each instruction cycle, and tracks the last digit of an instruction cycle number, which produces an instruction cycle counter value between 0-9. The line location tracker increments on each instruction cycle and produces a line location value that signifies a particular location on a page line. For example, a line location value of "42" represents the $42^{nd}$ space of a page line. Continuing with this example, an instruction cycle counter value of "4" and a line location value of "42" generates, on a performance graph, the number "4" at the $42^{nd}$ space on a page line.

When an instruction stalls (e.g. dependency conditions), the timing description generator logs a "stalled instruction identifier" and the line location value, which, when displayed on the performance graph, identifies that the instruction is stalled. The stalled instruction identifier may be an alphanumeric character or symbol, such as "~." Using the example described above, if the instruction stalls at the same instruction cycle, the performance graph displays a "~" at the $42^{nd}$ space on the page line instead of "4."

In an embodiment that includes multiple-issue capability, the timing description generator logs, for applicable instructions, a "pipeline identifier" and a "dual-issued prevented identifier" or a "dual-issue allowed identifier." The pipeline identifier corresponds to the pipeline that is slotted to execute the instruction, such as "0" for pipeline 0 or "1" for pipeline 1.

The dual-issue prevented identifier signifies that an instruction is eligible for dual-issue, but is prevented from issuing because of other instructions, such as an instruction start delay or another instruction using a required register. The dual-issue prevented identifier may be an alphanumeric character or symbol, such as "d." The dual-issue allowed identifier signifies that an instruction is eligible for dual-issue, and does in fact issue. The dual-issue allowed identifier may also be an alphanumeric character or symbol, such as "D."

Once the timing description generator cycles through the instructions and logs performance characteristics for each instruction, the timing description generator generates the performance graph. For each page line, the performance graph includes 1) dual-issue information if applicable, 2) instruction cycle counter values/stalled instruction identifier's that are positioned at corresponding line location values, and 3) the instruction. A developer may analyze the performance graph and identify code locations that require optimization in order to increase software performance.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
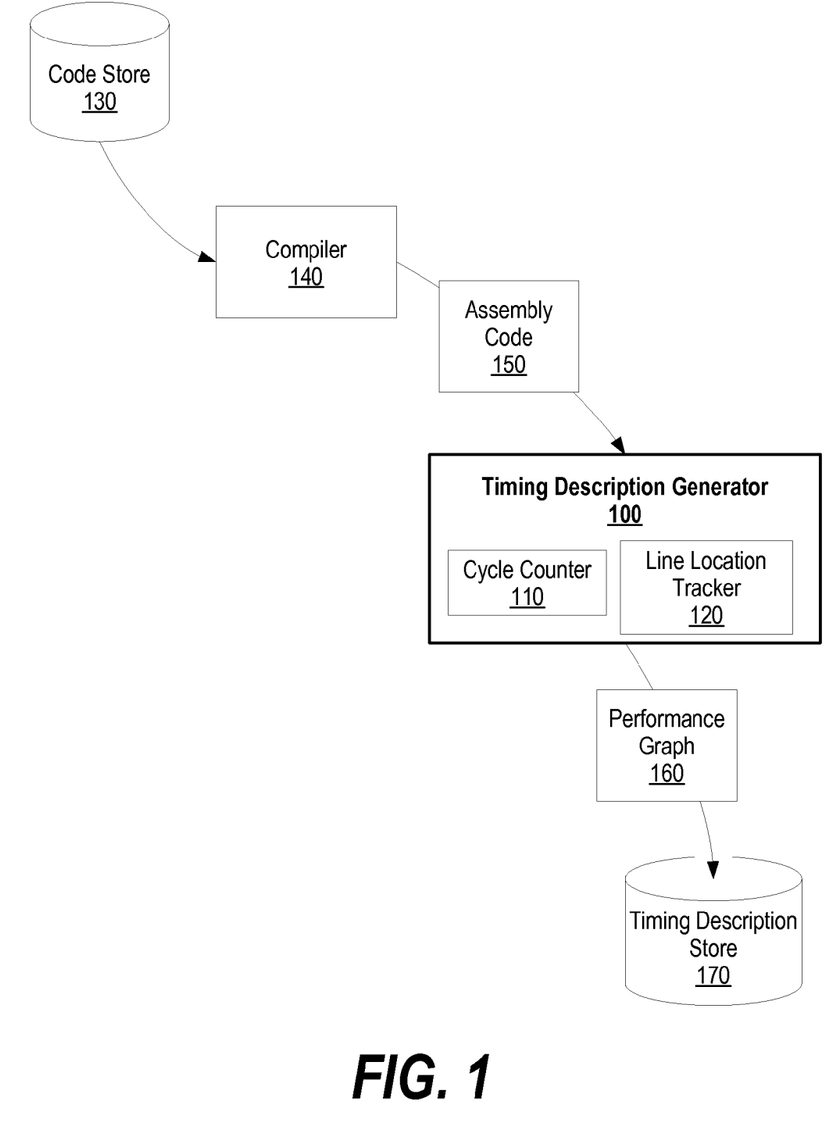
FIG. 1 is a diagram showing a timing description generator using assembly code to generate a performance graph.

FIG. 1 is a diagram showing a timing description generator using assembly code to generate a performance graph. FIG. 1 includes timing description generator 100, which logs instruction performance characteristics for each of assembly code 150's instructions, and generates performance graph 160 that includes the performance characteristics. The performance characteristics represent an instruction's execution progress as it fits into a program's actual instruction sequence. As such, performance graph 160 provides an extremely accurate representation of an instruction as it executes on a processor (see FIGS. 2, 3, and corresponding text for further details regarding performance graphs).

Compiler 140 receives code from code store 130, and generates assembly code 150, which is passed to timing description generator 100. For example, a developer may add an optional pass to compiler 140 that loads assembly code 150 into timing description generator 100. In one embodiment, timing description generator 100 resides within compiler 140. In another embodiment, a software developer may generate assembly code 150 instead of compiler 140.

Timing description generator 100 generates performance characteristics that provide a graphical representation of an instruction's performance. In one embodiment for providing a graphical representation, timing description generator 100 displays each instruction on a separate page line, and displays the instruction's execution progress in the same page line (performance characteristics) on a "line location" basis.

In order to track instruction cycles and line locations, timing description generator 100 includes instruction cycle counter 110 and line location tracker 120, which may be counters that count up to a particular value and then reset. Instruction cycle counter 110 increments on each instruction cycle, and tracks the last digit of an instruction cycle number, which produces an instruction cycle counter value between 0-9. Line location tracker 120 increments on each instruction cycle and produces a line location value that signifies a particular location on a page line. For example, a line location value of "42" represents the $42^{nd}$ space of a page line. Continuing with this example, an instruction cycle counter value of "4" and a line location value of "42" generates, on a performance graph, the number "4" at the $42^{nd}$ space on a page line.

When an instruction is stalled (e.g. dependency conditions), timing description generator 100 logs a "stalled instruction identifier" and the line location value, which, when displayed on performance graph 160, identifies that the instruction is stalled. The stalled instruction identifier may be an alphanumeric character or symbol, such as "~" shown in FIGS. 2 and 3. Using the example described above, if the instruction stalls at the same instruction cycle, the performance graph displays a "~" at the $42^{nd}$ space on the page line instead of "4."

Figure 2:
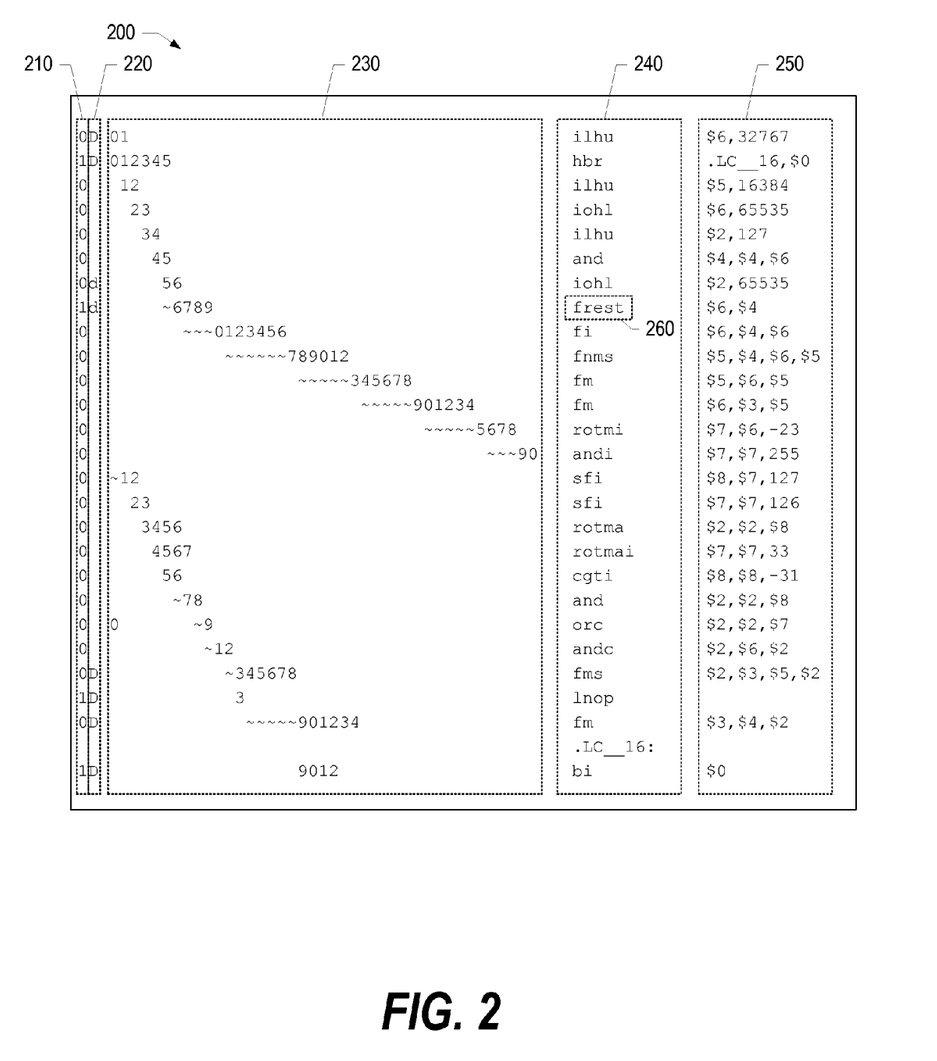
FIG. 2 is a diagram showing a performance graph of inefficient assembly code.
Figure 3:
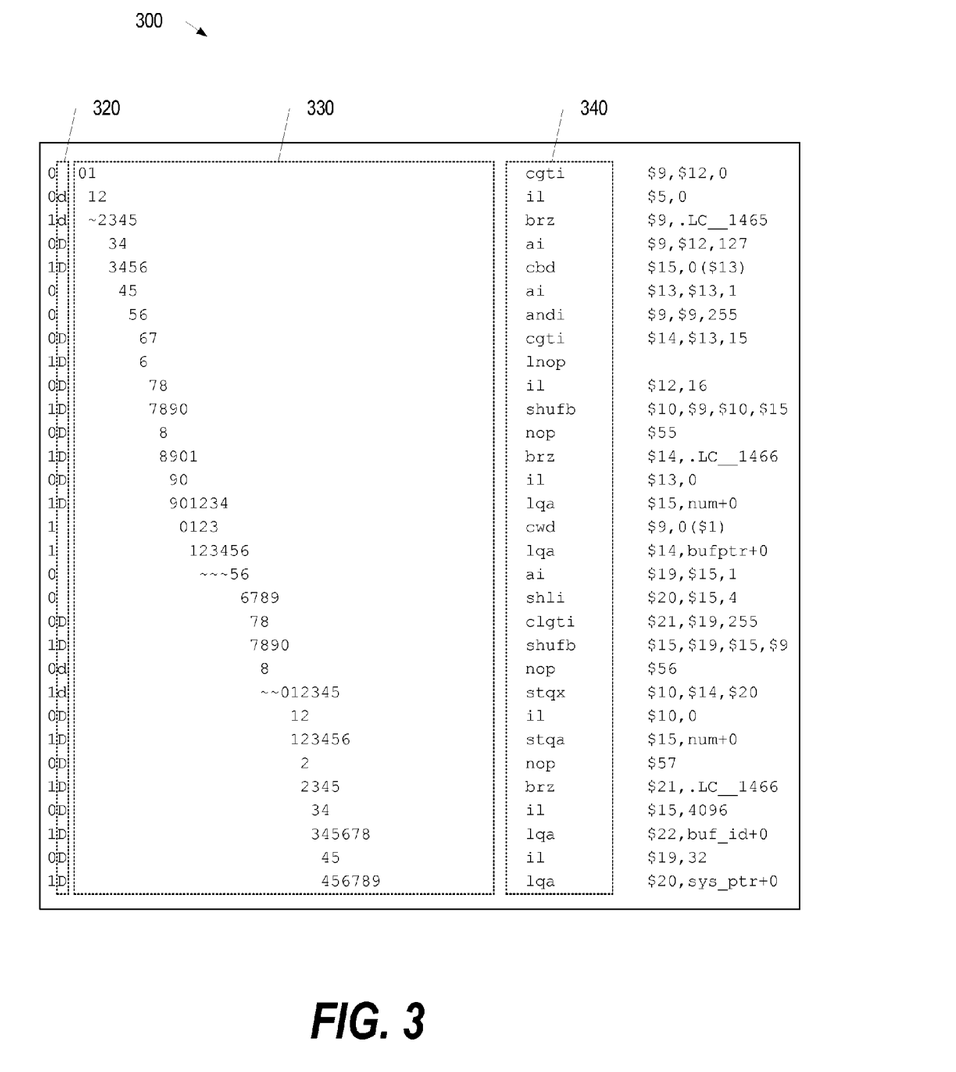
FIG. 3 is a diagram showing a performance graph of efficient assembly code.

In an embodiment that includes multiple-issue capability, timing description generator 100 logs, for applicable instructions, a "pipeline identifier" and a "dual-issued prevented identifier" or a "dual-issue allowed identifier." The pipeline identifier corresponds to the pipeline that is slotted to execute the instruction, such as "0" for pipeline 0 or "1" for pipeline 1 as shown in FIGS. 2 and 3.

The dual-issue prevented identifier signifies that an instruction is eligible for dual-issue, but is prevented from issuing because of other instructions, such as an instruction start delay or another instruction using a required register. The dual-issue prevented identifier may be an alphanumeric character or symbol, such as "d" shown in FIGS. 2 and 3. The dual-issue allowed identifier signifies that an instruction is eligible for dual-issue, and does in fact issue. The dual-issue allowed identifier may be an alphanumeric character or symbol, such as "D" shown in FIGS. 2 and 3.

Once timing description generator 100 cycles through the instructions and logs performance characteristics for each instruction, timing description generator 100 generates performance graph 160, which is stored in timing description store 170. As shown in FIGS. 2 and 3, for each page line, performance graph 160 includes 1) dual-issue information if applicable, 2) instruction cycle counter values/stalled instruction identifier's that are positioned at corresponding line location values, and 3) the instruction. A developer may analyze the performance graph and identify code locations that require optimization in order to increase performance. Timing description store 170 may be stored on a nonvolatile storage area, such as a computer hard drive.

FIG. 2 is a diagram showing a performance graph of inefficient assembly code. A timing description generator generates performance graph 200 from assembly code, which may be compiler-generated or developer-generated. Performance graph 200 includes columns 210 through 250. Column 240 includes, on a page line basis, a list of instructions from which performance characteristics are generated. Column 250 includes register locations and/or values corresponding to the instructions shown in column 240.

The embodiment shown in FIG. 2 corresponds to a dual-issue system. Column 210 includes a list of pipeline identifiers that identify the pipeline that each instruction listed in column 240 uses. When a page line includes "0" in column 210, the instruction is slotted in pipeline 0 for execution.

Likewise, when a page line includes "1" in column 210, the instruction is slotted in pipeline 1 for execution.

Figure 4:
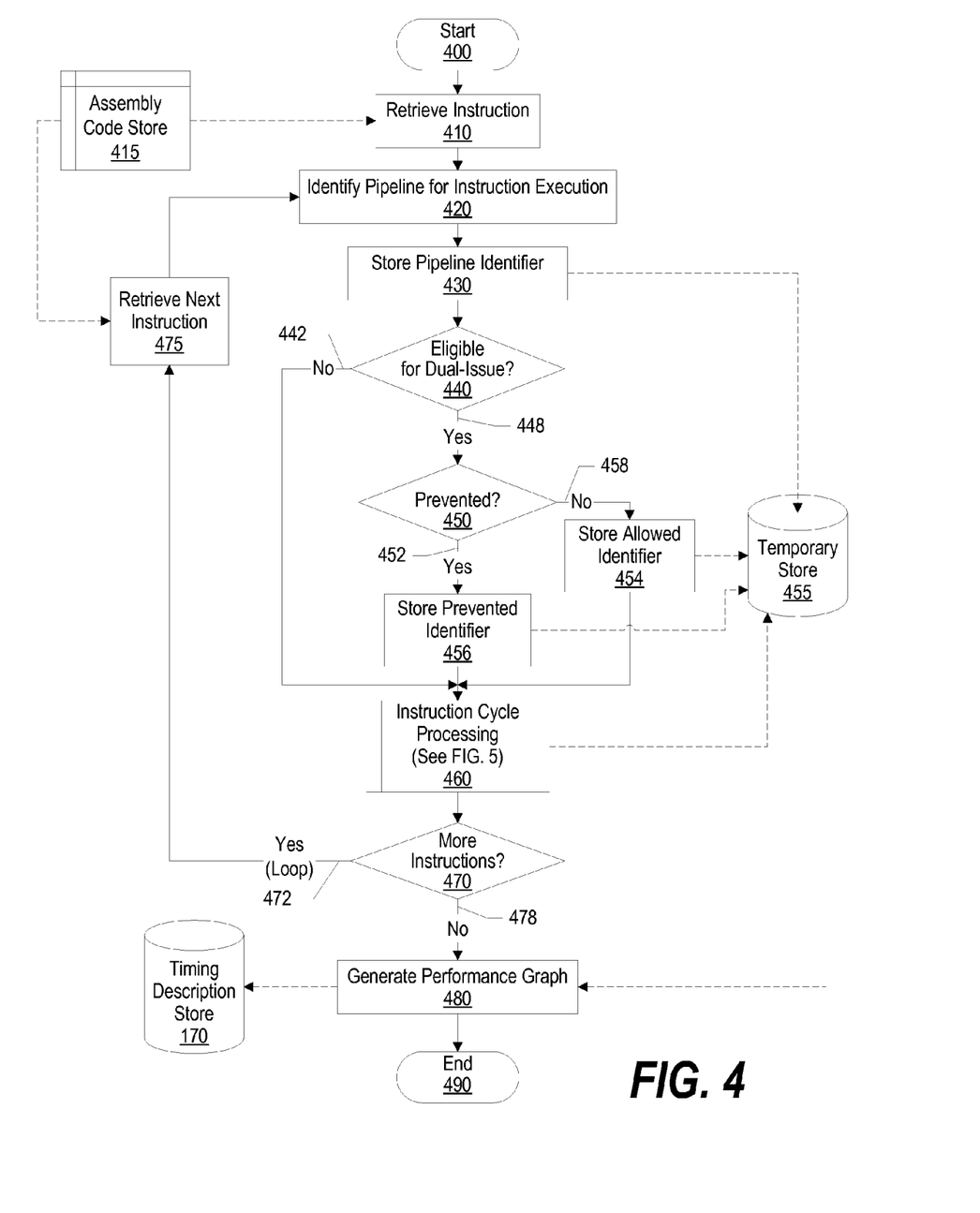
FIG. 4 is a high-level flowchart showing steps taken in generating an assembly code performance graph.

Column 220 includes dual-issue identifiers (prevented and allowed) for instructions that are eligible for dual-issue (see FIG. 4 and corresponding text for further details regarding dual-issue eligibility). When an instruction is eligible for dual-issue, the timing description generator logs either a dual-issue prevented identifier or a dual-issue allowed identifier based upon whether the instruction stalls or issues, respectively. For each page line that includes a "D" in column 220, the corresponding instruction dual-issued. For each page line that includes a "d" in column 220, the corresponding instruction was eligible to dual-issue but stalled for reasons such as dependency upon an unavailable register. For each page line that does not include either a "D" or a "d," the instruction was not eligible for dual-issue. As can be seen on performance graph 200, there are three pairs of instructions that will be dual-issued ("D") when the instructions execute on a processor, and one pair of instructions that are eligible to dual-issue, but will not ("d").

Column 230 includes performance characteristics of corresponding instructions that are listed in column 240. The performance characteristics include instruction cycle counter values and stalled instruction identifiers, both of which are positioned within column 230 based upon their corresponding line location values (see FIG. 5 and corresponding text for further details).

A developer may analyze performance graph 200, and quickly identify instructions that were eligible for dual-issue but did not. "Frest" instruction 260 is one of these instructions. Frest 260 depends upon register "4," but the previous "and" instruction does not make the register available until instruction cycle "6." Performance graph 200 also shows that the "iohl" instruction executed on instruction cycle 5 by itself, and a hyphen was placed in the instruction cycle 5's location for frest 260, indicating the stall. Beginning on instruction cycle 6, frest 260 begins execution. The next instruction, "fi," requires register "6" as input, but frest 260 does not make register 6 available until instruction cycle "10." In effect, fi's page line includes three "~'s" signifying that the "fi" instruction stalled for three instruction cycles.

Looking at performance graph 200, a developer can easily spot code inefficiency from the horizontal nature of column 230's performance characteristics. Especially in the eighth through fourteenth instructions, whereby their corresponding page lines include multiple stalled instruction identifiers. In effect, a developer may modify particular low-performance code areas to make the code more efficient.

FIG. 3 is a diagram showing a performance graph of efficient assembly code. Performance graph 300 is similar to performance graph 200 shown in FIG. 2, with the exception that the code used (column 340) to generate performance graph 300 is much more efficient. As can be seen in column 320, performance graph 300 includes eleven instruction pairs that will be dual-issued ("D"), and two instruction pairs that would have been dual-issued had their prerequisites been met ("d"). By visually inspecting column 330, a developer can easily see the performance characteristics slope is steep and include very few stalled instruction identifiers, which indicates much more efficient code than what was used to generate performance graph 200.

FIG. 4 is a high-level flowchart showing steps taken in generating an assembly code performance graph. Processing commences at 400, whereupon processing retrieves an instruction from assembly code store 415 (step 410). Assembly code store 415 includes assembly code instructions that may be compiler-generated or developer-generated. Assembly code store 415 may be stored on volatile or nonvolatile memory, such as a computer hard drive or computer memory.

At step 420, processing identifies a pipeline for executing the instruction based upon corresponding hardware attributes. For example, if a system is dual-issue, step 420 identifies whether the instruction is slotted to execute on "pipeline 0" or pipeline 1." As one skilled in the art can appreciate, this step is not required for single-issue only systems. Processing stores a pipeline identifier corresponding to the identified pipeline in temporary store 455 at step 430. For example, if the identified pipeline was "pipeline 0," processing stores "0" as a pipeline identifier. Temporary store 455 may be stored on a nonvolatile storage area, such as a computer hard drive.

A determination is made as to whether the instruction is eligible for dual-issue based upon the instruction's address and execution pipes (decision 440). Again, as one skilled in the art can appreciate, this decision is not required for single-issue only systems. If the instruction is not eligible for dual-issue, decision 440 branches to "No" branch 442 bypassing dual-issue logging steps.

On the other hand, if the instruction is eligible for dual-issue, decision 440 branches to "Yes" branch 448 whereupon a determination is made as to whether the instruction is prevented from dual-issuing (decision 450). For example, an instruction may be eligible for dual-issue, but other instructions corresponding to the instruction prevented the instruction from issuing because of reasons such as an instruction start delay or another instruction using a required register.

If the instruction is prevented from issuing, decision 450 branches to "Yes" branch 452 whereupon processing stores a "dual-issue prevented identifier" to temporary store 455 (step 456). The dual-issue prevented identifier may be an alphanumeric character or symbol that signifies that the instruction was prevented from dual-issuing. For example, FIGS. 2 and 3 show "d" as a dual-issue prevented identifier.

On the other hand, if the instruction is not prevented from issuing, decision 450 branches to "No" branch 458 whereupon processing stores a "dual-issue allowed identifier" to temporary store 455 (step 454). The dual-issue allowed identifier may be an alphanumeric character or symbol that signifies that the instruction was allowed to dual-issue. For example, FIGS. 2 and 3 show "D" as a dual-issue allowed identifier.

Figure 5:
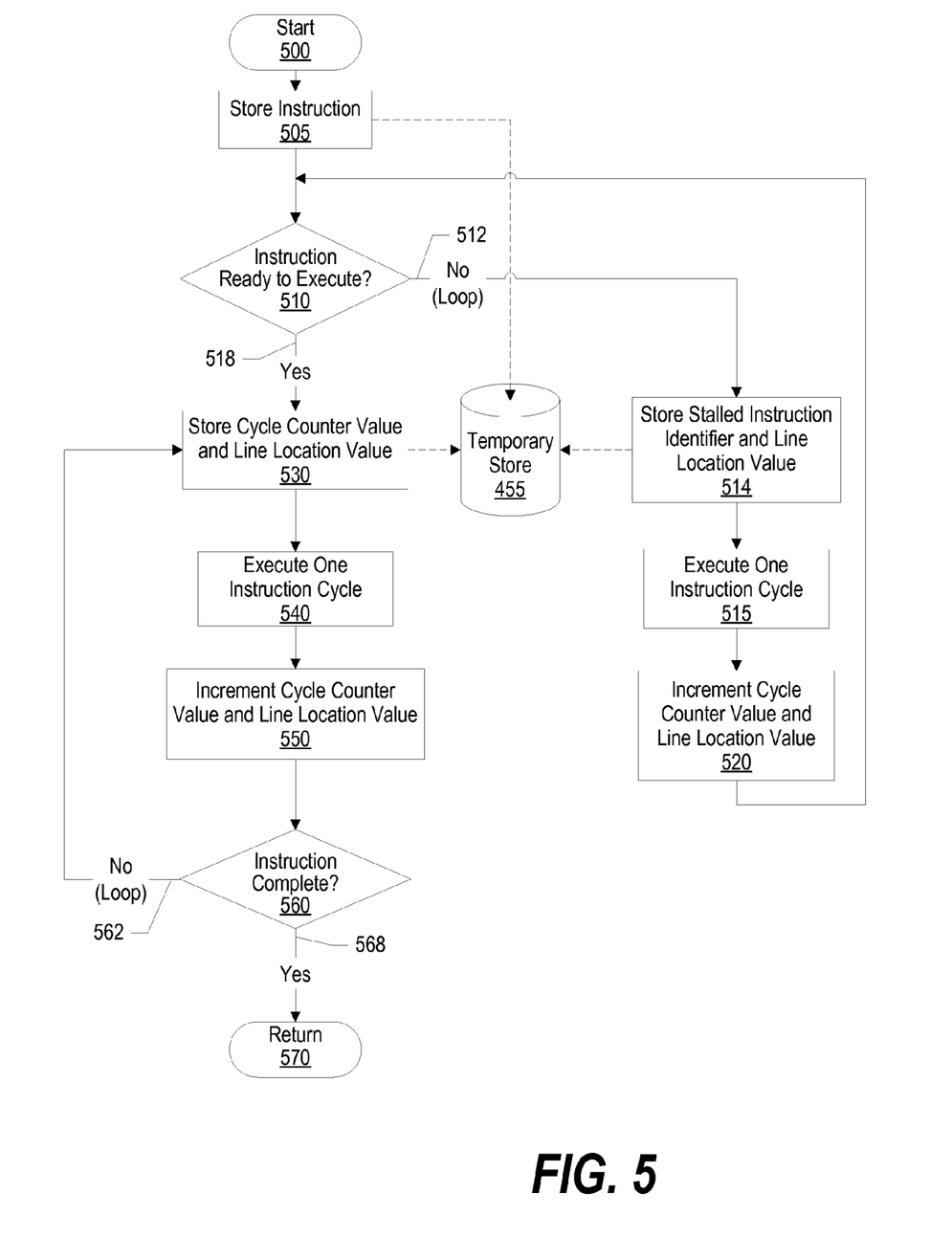
FIG. 5 is a flowchart showing steps taken in tracking instruction execution for use in generating a performance graph.

Processing proceeds through a series of steps to track an instruction's execution progress, and stores the instruction's performance characteristic in temporary store 455 (pre-defined process block 460, see FIG. 5 and corresponding text for further details). A determination is made as to whether assembly code store 415 has more instructions to graph performance (decision 470). If there are more instructions to graph performance, decision 470 branches to "Yes" branch 472, which loops back to retrieve (step 475) and process the next instruction. This looping continues until there are no more instructions to graph performance, at which point decision 470 branches to "No" branch 478.

At step 480, processing retrieves the stored performance characteristics and identifiers from temporary store 455, and generates a performance graph, which is stored in timing description store 170. As shown in FIGS. 2 and 3, for each page line, the performance graph includes 1) dual-issue information if applicable, 2) instruction cycle counter values/ stalled instruction identifier's that are positioned at corresponding line location values, and 3) the instruction. A developer may analyze the performance graph and identify code locations that require optimization in order to increase performance. Timing description store 170 is the same as that shown in FIG. 1.

FIG. 5 is a flowchart showing steps taken in tracking instruction execution for use in generating a performance graph. Processing commences at 500, whereupon processing stores an instruction in temporary store 455 at step 505. The performance graph displays, for each page line, the instruction as well as its performance characteristics. Temporary store 455 is the same as that shown in FIG. 4.

A determination is made as to whether the instruction is ready to execute based upon corresponding hardware attributes (decision 510). If the instruction is not ready to execute, decision 510 branches to "No" branch 512, which loops back and processing stores a "stalled instruction identifier" and a "line location value" (processing characteristics) in temporary store 455 (step 514). The stalled instruction identifier may be an alphanumeric character or symbol that signifies that the instruction was stalled and did not execute at the corresponding instruction cycle. For example, FIGS. 2 and 3 show "~" as an stalled instruction identifier. At step 515, processing executes one instruction cycle and, at step 520, processing increments the instruction cycle counter value and the line location value. This looping continues and stalled instruction identifiers/line location values are stored until the instruction is ready to execute.

When the instruction is ready to execute, decision 510 branches to "Yes" branch 518 whereupon processing stores the instruction's performance characteristics for the particular instruction cycle in temporary store 455 that includes an "instruction cycle counter value" and the line location value (step 530). For example, the instruction cycle counter value may be "8" and the line location value may be "28."

At step 540, processing executes one instruction cycle and, at step 550, processing increments the instruction cycle counter value and the line location value. A determination is made as to whether the instruction is complete (decision 560). For example, an instruction may take four instruction cycles to complete. If the instruction is not complete, decision 560 branches to "No" branch 562 which loops back to process and log the next instruction cycle. This looping continues until the instruction is complete, at which point decision 560 branches to "Yes" branch 568 whereupon processing returns at 570.

Figure 6:
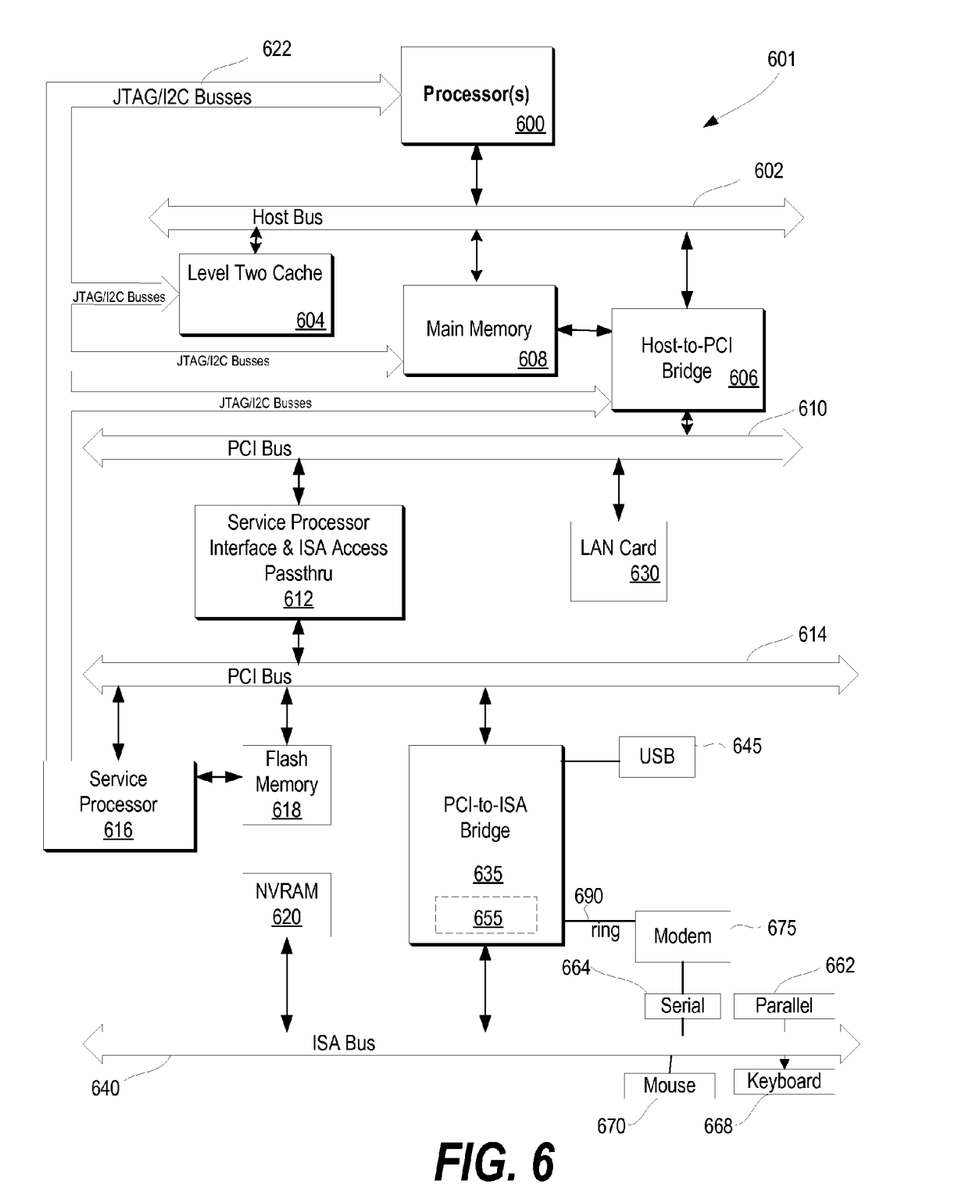
FIG. 6 is block diagram of a computing device capable of implementing the present invention.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 675 is connected to serial port 664 and PCI-to-ISA Bridge 635.

While the computer system described in FIG. 6 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   retrieving an instruction;
   determining whether the instruction is ready to execute;
   storing performance characteristics that include an instruction cycle counter value and a line location value in response to determining that the instruction is ready to execute, wherein the instruction cycle counter value is a last digit of an instruction clock cycle, and wherein the line location value signifies a location on a page line at which to display the instruction cycle counter value;
   storing performance characteristics that include a stalled instruction identifier and the line location value in response to determining that the instruction is not ready to execute; and
   generating a performance graph using the performance characteristics, wherein the generation comprises:
      displaying the instruction cycle counter value at the location on the page line corresponding to the line location value in response to the instruction being ready to execute; and
      displaying the stalled instruction identifier at the location on the page line corresponding to the line location value in response to the instruction failing to be ready to execute.

2. The method of claim 1 further comprising:
   executing one instruction clock cycle; and
   incrementing the instruction cycle counter value and the line location value.

3. The method of claim 2 further comprising:
   determining that the instruction is not complete; and
   storing the incremented instruction cycle counter and the incremented line location value in response to determining that the instruction is not complete.

4. The method of claim 1 further comprising:
   detecting a pipeline identifier corresponding to the instruction, the pipeline identifier corresponding to a pipeline that is included in a plurality of pipelines;
   storing the pipeline identifier in response to the detecting; and
   wherein the generated performance graph includes the pipeline identifier.

5. The method of claim 1 further comprising:
   identifying that the instruction is eligible for dual-issue;
   determining whether the instruction is prevented from dual-issuing in response to the identifying;
   storing a dual-issue prevented identifier in response to determining that the instruction is prevented from dual-issuing;
   storing a dual-issue allowed identifier in response to determining that the instruction is not prevented from dual-issuing; and
   wherein the generated performance graph includes the dual-issue prevented identifier or the dual-issue allowed identifier.

6. The method of claim 1 wherein the page line includes the instruction, a dual-issue prevented symbol or a dual-issue allowable symbol, and a pipeline identifier.

7. A computer program product comprising:
   a computer operable medium having computer readable code, the computer readable code being effective to:
      retrieve an instruction;
      determine whether the instruction is ready to execute;
      store performance characteristics that include an instruction cycle counter value and a line location value in response to determining that the instruction is ready to execute, wherein the instruction cycle counter value is a last digit of an instruction clock cycle, and wherein the line location value signifies a location on a page line at which to display the instruction cycle counter value;
      store performance characteristics that include a stalled instruction identifier and the line location value in response to determining that the instruction is not ready to execute; and
      generate a performance graph using the performance characteristics, the computer program product being further effective to:
         display the instruction cycle counter value at the location on the page line corresponding to the line location value in response to the instruction being ready to execute; and
         display the stalled instruction identifier at the location on the page line corresponding to the line location value in response to the instruction failing to be ready to execute.

8. The computer program product of claim 7 wherein the computer readable code is further effective to:
   execute one instruction clock cycle; and
   increment the instruction cycle counter value and the line location value.

9. The computer program product of claim 8 wherein the computer readable code is further effective to:
   determine that the instruction is not complete; and
   store the incremented instruction cycle counter and the incremented line location value in response to determining that the instruction is not complete.

10. The computer program product of claim 7 wherein the computer readable code is further effective to:
    detect a pipeline identifier corresponding to the instruction, the pipeline identifier corresponding to a pipeline that is included in a plurality of pipelines;
    store the pipeline identifier in response to the detecting; and
    wherein the generated performance graph includes the pipeline identifier.

11. The computer program product of claim 7 wherein the computer readable code is further effective to:
    identify that the instruction is eligible for dual-issue;
    determine whether the instruction is prevented from dual-issuing in response to the identifying;
    store a dual-issue prevented identifier in response to determining that the instruction is prevented from dual-issuing;
    store a dual-issue allowed identifier in response to determining that the instruction is not prevented from dual-issuing; and
    wherein the generated performance graph includes the dual-issue prevented identifier or the dual-issue allowed identifier.

12. The computer program product of claim 7 wherein the page line includes the instruction, a dual-issue prevented symbol or a dual-issue allowable symbol, and a pipeline identifier.

13. An information handling system comprising:
    one or more processors;
    a memory accessible by the processors;

one or more nonvolatile storage devices accessible by the processors; and a performance graph generation tool for generating a performance graph, the performance graph generation tool being effective to:

retrieve an instruction from one of the nonvolatile storage devices;

determine whether the instruction is ready to execute;

store performance characteristics in one of the nonvolatile storage devices that include an instruction cycle counter value and a line location value in response to determining that the instruction is ready to execute, wherein the instruction cycle counter value is a last digit of an instruction clock cycle, and wherein the line location value signifies a location on a page line at which to display the instruction cycle counter value;

store performance characteristics in one of the nonvolatile storage devices that include a stalled instruction identifier and the line location value in response to determining that the instruction is not ready to execute; and generate a performance graph using the performance characteristics, the performance graph generation tool being further effective to:

display the instruction cycle counter value at the location on the page line corresponding to the line location value in response to the instruction being ready to execute; and display the stalled instruction identifier at the location on the page line corresponding to the line location value in response to the instruction failing to be ready to execute.

14. The information handling system of claim 13 wherein the performance graph generation tool is further effective to:

execute one instruction clock cycle; and increment the instruction cycle counter value and the line location value.

15. The information handling system of claim 14 wherein the performance graph generation tool is further effective to:

determine that the instruction is not complete; and store the incremented instruction cycle counter and the incremented line location value in one of the nonvolatile storage devices in response to determining that the instruction is not complete.

16. The information handling system of claim 13 wherein the performance graph generation tool is further effective to:

detect a pipeline identifier corresponding to the instruction, the pipeline identifier corresponding to a pipeline that is included in a plurality of pipelines;

store the pipeline identifier in one of the nonvolatile storage devices in response to the detecting; and wherein the generated performance graph includes the pipeline identifier.

17. The information handling system of claim 13 wherein the performance graph generation tool is further effective to:

identify that the instruction is eligible for dual-issue;

determine whether the instruction is prevented from dual-issuing in response to the identifying;

store a dual-issue prevented identifier in one of the nonvolatile storage devices in response to determining that the instruction is prevented from dual-issuing;

store a dual-issue allowed identifier in one of the nonvolatile storage devices in response to determining that the instruction is not prevented from dual-issuing; and wherein the generated performance graph includes the dual-issue prevented identifier or the dual-issue allowed identifier.

* * * * *